United States Patent
Rivoalen et al.

(10) Patent No.: US 12,120,163 B2
(45) Date of Patent: Oct. 15, 2024

(54) METHOD FOR MANAGING TIME HOPS WHEN PLAYING BACK A MULTIMEDIA CONTENT

(71) Applicant: ORANGE, Issy-les-Moulineaux (FR)

(72) Inventors: Mathieu Rivoalen, Chatillon (FR); Hervé Marchand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/069,512

(22) Filed: Dec. 21, 2022

(65) Prior Publication Data

US 2023/0208899 A1  Jun. 29, 2023

(30) Foreign Application Priority Data

Dec. 23, 2021 (FR) ..................................... 2114347

(51) Int. Cl.
| | |
|---|---|
| *G06F 15/16* | (2006.01) |
| *H04L 65/611* | (2022.01) |
| *H04N 21/43* | (2011.01) |
| *H04N 21/472* | (2011.01) |

(52) U.S. Cl.
CPC ....... *H04L 65/611* (2022.05); *H04N 21/4307* (2013.01); *H04N 21/472* (2013.01)

(58) Field of Classification Search
CPC . H04L 65/611; H04N 21/4307; H04N 21/472
See application file for complete search history.

(56) References Cited

U.S. PATENT DOCUMENTS

| | | | | |
|---|---|---|---|---|
| 5,926,206 A | * | 7/1999 | Mihara | H04N 21/4384 348/E7.071 |
| 7,454,166 B2 | * | 11/2008 | Patsiokas | H04H 40/90 455/3.06 |
| 7,979,879 B2 | * | 7/2011 | Kazama | H04N 21/482 725/39 |
| 8,392,593 B1 | * | 3/2013 | Wadhwa | H04L 12/185 726/28 |

(Continued)

FOREIGN PATENT DOCUMENTS

WO   0114986 A1   3/2001

OTHER PUBLICATIONS

French Search Report and Written Opinion dated Aug. 9, 2022, for corresponding French Application No. FR 2114347, filed Dec. 23, 2021.

(Continued)

*Primary Examiner* — Oleg Survillo
(74) *Attorney, Agent, or Firm* — David D. Brush; Westman, Champlin & Koehler, P.A.

(57) ABSTRACT

A method for managing time hops when playing back a multimedia content item received by a playback device via a communication network. The method includes obtaining a plurality of broadcast channels for the same content item, the respective broadcast times being spaced in time, wherein, during rendering of the content item via a channel, called first channel, receipt of a time hop command for a time hop in the content item brings about: a step of selecting a second broadcast channel, different from the first broadcast channel; and during a hop, a step of rendering images broadcast on broadcast channels belonging to the plurality of broadcast channels.

6 Claims, 3 Drawing Sheets

(56) References Cited

U.S. PATENT DOCUMENTS

| | | | | |
|---|---|---|---|---|
| 8,776,157 B2* | 7/2014 | Alexander | ......... | H04N 21/6587 |
| | | | | 725/115 |
| 2002/0012527 A1* | 1/2002 | Higashimura | ......... | H04N 5/783 |
| | | | | 386/E5.052 |
| 2003/0037331 A1* | 2/2003 | Lee | .................... | H04N 21/2225 |
| | | | | 725/86 |
| 2009/0172763 A1* | 7/2009 | Liu | ....................... | H04L 65/612 |
| | | | | 725/114 |
| 2009/0241144 A1* | 9/2009 | LaJoie | ................ | H04N 21/6118 |
| | | | | 725/39 |
| 2010/0166393 A1* | 7/2010 | Park | ................. | H04N 21/47217 |
| | | | | 725/38 |
| 2012/0141088 A1* | 6/2012 | Isozu | ............. | H04N 21/440281 |
| | | | | 386/230 |
| 2016/0021421 A1* | 1/2016 | Panger | ................. | H04N 21/442 |
| | | | | 725/18 |

OTHER PUBLICATIONS

English Translation of French Written Opinion dated Nov. 30, 2022, for corresponding French Application No. FR 2114347, filed Dec. 23, 2021.

* cited by examiner

[Fig 1]
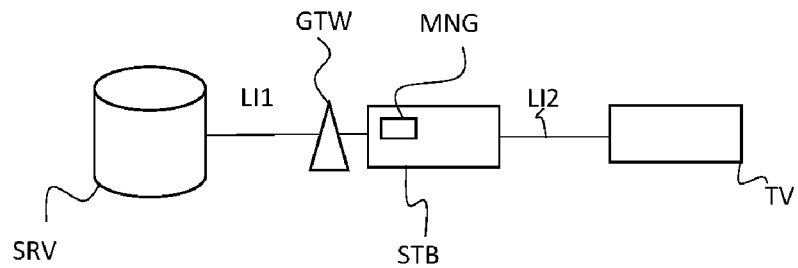
[Fig 2]
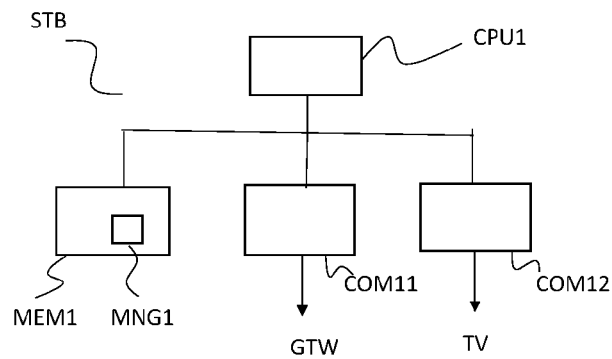
[Fig 3]
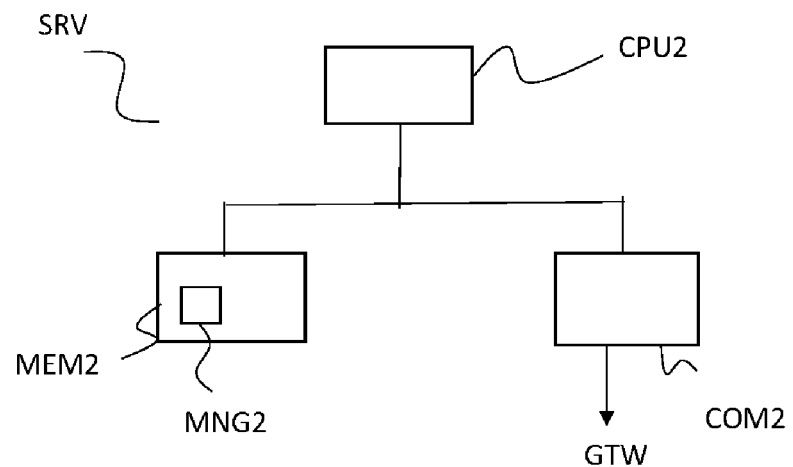

[Fig 4]
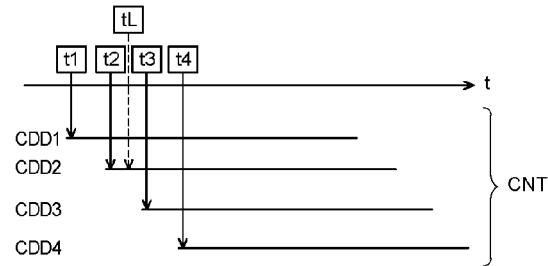
[Fig 5]
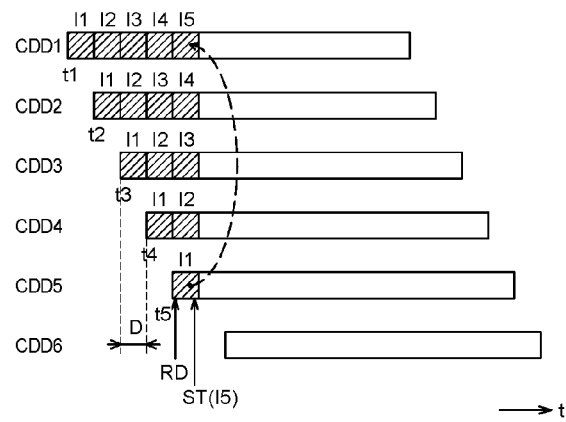
[Fig 6]
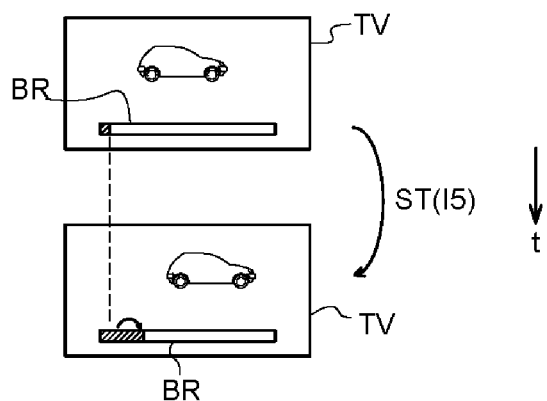

[Fig 7]
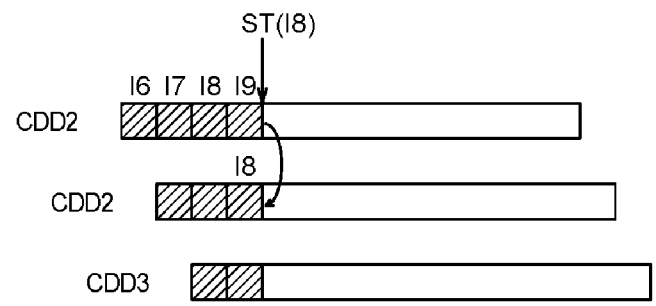
[Fig 8]
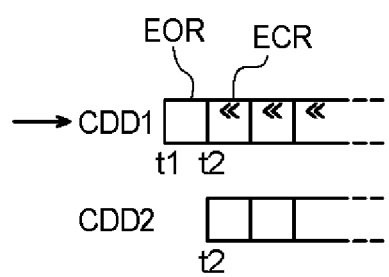
[Fig 9]
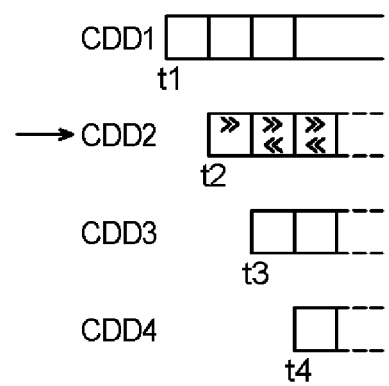

METHOD FOR MANAGING TIME HOPS WHEN PLAYING BACK A MULTIMEDIA CONTENT

TECHNICAL FIELD

The field of the invention is that of digital multimedia content items, specifically digital audio and/or video content items, also called audiovisual content items. The invention relates very particularly to a method for managing time hops when playing back a multimedia content item.

A content item is for example a television-on-demand content item, a video-on-demand content item, etc. The invention very particularly targets content items the rendering of which prevents navigation in the content item, in particular content items broadcast in multicast mode. Such a content item is for example a "live" content item broadcast by a television channel.

A playback device targets all devices able to receive multimedia streams, for example a set-top box, a mobile telephone, a tablet, etc.

A time hop performed when playing back a content item consists in selecting an image other than the image currently being rendered and in restarting playback from this other image. Considering a current playback time, if said other image is situated at a time later than the current time, reference will be made in this case to fast-forwarding in the content item; by contrast, if said other image is situated at a previous time, reference will be made to rewinding in the content item.

BACKGROUND

In general, live content broadcasting is based on multicast broadcast technology (also called "multipoint" or "group broadcast" broadcasting by those skilled in the art). In contrast to the unicast broadcast mode, this technology makes it possible to save an enormous amount of bandwidth in the network of an operator managing the broadcasting, since the content item is replicated as close as possible to the playback devices.

However, one problem with the multicast broadcast mode is that it does not allow navigation in the content item; in other words, this mode does not make it possible to perform time hops in the content item in order to play back the content item more quickly or to replay part of the content item. In other words, multicast mode does not make it possible, during playback, to select an image and to restart playback from this selected image, as is the case with unicast mode.

SUMMARY

An exemplary aspect of the present patent application offers a solution that does not have the drawbacks of the prior art.

To this end, according to a first functional aspect, one subject of the invention is a method for managing time hops when playing back a multimedia content item received by a playback device via a communication network, the method comprising a step of obtaining a plurality of broadcast channels for the same content item, the respective broadcast times being spaced in time, characterized in that, during rendering of the content item via a channel, called first channel, receipt of a time hop command for a time hop in the content item brings about a step of selecting a broadcast channel, called second channel, different from the first broadcast channel;
during a hop, a step of rendering images broadcast on broadcast channels belonging to said plurality of broadcast channels.

According to an exemplary aspect of the disclosure, multiple broadcast channels are created for the same content item with broadcast times that are spread over time, respectively. The content item in question may be played back via a broadcast channel of choice. By virtue of the plurality of broadcast channels for the same content item and of the time spreading of the broadcast times of these channels, it is possible to fast forward or rewind in the content item by replacing the channel currently being used with another, separate channel. In addition, the images rendered successively during a hop help to ascertain the state of progress of the time hop.

By virtue of an exemplary aspect of the disclosure, it is possible to navigate in a content item broadcast in multicast mode in exactly the same way as a content item broadcast in unicast mode. The management of the selection of the channels, when changing from one channel to another channel, is transparent to a user viewing the content item, in the sense that it does not occur, when navigating (fast-forwarding or rewinding) in the content item, whether the content item is broadcast in unicast mode or multicast mode.

When a content item is received in unicast mode and a time hop is performed, for example rewinding, images are generally rendered successively in order to help to visualize the state of progress of the rewinding in the content item. An exemplary aspect of the disclosure makes it possible, with a multicast broadcast mode, to obtain the same result as that offered by the unicast broadcast mode by rendering, during a time hop, images originating from various multicast streams relating to the same content item; the images extracted from the various streams are rendered successively and make it possible to visualize the state of progress of the time hop.

According to a first embodiment, the selected second channel is a channel adjacent to the first channel. This first embodiment is useful when the time spacing between broadcast times is relatively great in comparison with the rendering duration of the content item, for example ten minutes for a one-hour content item; in this case, a management entity, which will be defined below, will select an adjacent channel, that is to say either to the channel whose broadcast time precedes the broadcast time of the selected channel, or to the channel whose broadcast time is later than the broadcast time of the selected channel depending on the desired navigation type, specifically fast-forwarding in the content item or rewinding in the content item.

According to a second embodiment, which may be implemented as an alternative or in addition to the previous embodiment, when intermediate channels are inserted between the first and the second channel, the rendered images belong to the intermediate channels; the images being rendered successively in the direction of the time hop. This second embodiment is useful when the first entity performs hops between channels that are not adjacent. Rendering intermediate images makes it possible to simulate fast-forwarding in the content item as would occur with a unicast stream when fast-forwarding is performed in the content item. Indeed, the successive time hops give rise to images that make it possible to visualize the state of progress of the fast-forwarded playback of the content item.

According to one variant of this second embodiment, the rendered images are able to be selected; selecting a rendered image triggering stoppage of the hop and playback of the content item from this image. This variant offers the possibility of scrolling through images representative of a state of progress of the rendering on various broadcast channels and of selecting an image from which it is desired to resume playback.

According to a third embodiment, which may be implemented as an alternative or in addition to the previous embodiments, when the time hop command relates to fast-forwarding in the content item, the time hop command on the first channel is activated as soon as at least one second channel broadcasts the content item at the time of receipt of the hop command. This embodiment avoids activating a hop command that is unusable at a given time.

According to a fourth embodiment, which may be implemented as an alternative or in addition to the previous embodiments, the channels that are obtained are able to broadcast the content item in multicast mode. Although an exemplary aspect of the disclosure is applicable to all types of stream, unicast or multicast, an exemplary aspect of the disclosure is of particular benefit for streams broadcast in multicast mode; indeed, as explained in the section dedicated to the prior art, the multicast broadcast mode does not make it possible, when a single multicast broadcast channel is used, to perform time hops when playing back a content item on this same channel. By virtue of the multicasting of the content item and of the time spacing between broadcast times, an exemplary aspect of the disclosure offers a possibility of navigating in exactly the same way as in a content item broadcast in unicast mode.

According to a first hardware aspect, the invention relates to a management entity for managing time hops when playing back a multimedia content item received by a playback device via a communication network, the entity comprising a module for obtaining a plurality of broadcast channels for the same content item, the respective broadcast times being spaced in time, characterized in that the entity comprises a processor configured to perform the following steps, during rendering of the content item via a channel, called first channel, receipt of a time hop command for a time hop in the content item brings about a step of selecting a broadcast channel, called second channel, different from the first broadcast channel;

during a hop, a step of rendering images broadcast on broadcast channels belonging to said plurality of broadcast channels.

According to a second hardware aspect, the invention relates to a playback device comprising a management entity as defined above.

According to a third hardware aspect, the invention relates to a computer program able to be implemented on an entity as defined above, the program comprising code instructions that, when it is executed by a processor, performs the steps of the managing method that are defined above.

Finally, according to a fourth hardware aspect, the invention relates to a data medium on which at least one series of program code instructions for executing a management method as defined in conjunction with the second functional aspect has been stored.

Such a recording medium may be any entity or device capable of storing the program. For example, the medium may comprise a storage means, such as a ROM, for example a CD-ROM or a microelectronic circuit ROM, or else a magnetic recording means, for example a USB key or a hard disk. Moreover, such a recording medium may be a transmissible medium such as an electrical or optical signal, which may be routed via an electrical or optical cable, by radio or by other means, such that the computer program that it contains is able to be executed remotely. The program according to an exemplary aspect of the disclosure may in particular be downloaded from a network, for example the Internet.

As an alternative, the recording medium may be an integrated circuit in which the program is incorporated, the circuit being designed to execute or to be used in the execution of the abovementioned display control method.

BRIEF DESCRIPTION OF THE DRAWINGS

One or more exemplary aspects of the present disclosure will be better understood on reading the following description, which is given by way of example and with reference to the appended drawings, in which:

FIG. 1 shows a computer system on which an exemplary an exemplary aspect of the disclosure is illustrated.

FIG. 2 is a simplified block diagram of the hardware structure of the playback device;

FIG. 3 is a simplified block diagram of the hardware structure of the server;

FIG. 4 illustrates multiple broadcast channels for the same content item with different broadcast times that are spread over time.

FIG. 5 illustrates a time hop that has the effect of fast-forwarding in the content item.

FIG. 6 illustrates a progress bar visible on a screen at two instants in time showing a state preceding the hop, and a state following the time hop.

FIG. 7 illustrates a time hop that has the effect of rewinding in the content item.

FIG. 8 illustrates a case in which the time hop command is activated or deactivated.

FIG. 9 illustrates another case in which the time hop command is activated or deactivated.

DETAILED DESCRIPTION OF EXEMPLARY EMBODIMENTS

FIG. 1 shows a computer system SYS in which a content broadcast network, also called CDN (Content Distribution Network) by those skilled in the art, is implemented, from which content items are transmitted to client devices or content playback devices.

In our example, the system comprises a single playback device. However, an exemplary aspect of the disclosure is applicable to any number of playback devices.

The playback device is for example a set-top box STB.

The multimedia content item targeted here is a video content item corresponding to a television channel broadcasting televised programs having a start time corresponding to a scheduled broadcast time and an end time.

A "play from the start" function is provided in order to watch a content item from the start thereof when it has already started.

The computer system SYS comprises a multimedia stream playback device STB, for example a set-top box connected to a rendering terminal TV such as a television.

In our example, the playback device STB is connected to a port of the rendering device TV; the playback device and the rendering device TV could also form just one and the same device.

In our example, the playback device STB is located in a local area network LAN managed by a home gateway GTW. The context of the local area network is given by way of example and could easily be transposed to a "best-effort" Internet network, to a company network, etc.

The gateway GTW is able to communicate via a telecommunications network LI1, such as a wide area network WAN known to those skilled in the art.

The CDN consists of servers that are networked in the wide area network; these servers cooperate in order to make multimedia content items available to users. To simplify the present disclosure, a single content server SRV will be shown in FIG. 1 to represent the CDN.

The content server SRV is located, in our example, in the wide area network WAN. The content server SRV receives for example channels of digital-television content from a television broadcast network (not shown) and makes them available to client terminals, here the playback device STB.

The content items CNT are made available in a given format. Such a content item CNT is for example a content item downloaded in adaptive streaming mode. The MPEG-DASH (for "Dynamic Adaptive Streaming over HTTP") standard is an audiovisual broadcasting format standard for broadcasting over the Internet; this standard is based on preparing the content item in various representations of variable quality and bit rate, divided into segments of a short duration (of the order of a few seconds), also called "chunks" by those skilled in the art. Each of these segments is made available individually by way of an exchange protocol between the rendering terminal and the multimedia content provider server. The protocol that is mainly targeted is the HTTP protocol, but other protocols (for example FTP) may also be used. The organization of the segments and the associated parameters are published in a description file in XML format. We will not go into more detail regarding this downloading mode because it is irrelevant to the disclosure of the invention.

FIG. 2 shows an architecture of a playback device STB. This device STB comprises, as is conventional, memories MEM1 associated with a processor CPU1. The memories may be ROMs (Read-Only Memory) or RAMs (Random Access Memory) or even flash memories.

The set-top box STB may transmit a content item to be rendered to the rendering device TV via a communication module COM12. This module COM12 is for example an HDMI link.

The set-top box STB communicates with the gateway via an Ethernet module for wireless local communication or via a Wi-Fi radio module for wireless local communication with the home gateway GTW. The module in question is referenced CMO11 in FIG. 2.

The set-top box STB comprises a streaming-mode download entity (not shown) able to manage the downloading of segments. The set-top box STB also comprises a management entity MNG1, called first management entity hereinafter, the function of which will be described below.

With reference to FIG. 3, the server SRV is also equipped with at least one processor CPU2 and with memories MEM2 for performing computerized processing. The server is also equipped with a management entity MNG2, called second entity, able to manage the transmission of a content item from the server SRV to one or more playback devices. The server SRV communicates with the gateway GTW via a network WAN in order to communicate with the home gateway GTW. The module in question is referenced CMO2 in FIG. 3.

According to an exemplary aspect of the disclosure, the first management entity MNG1 firstly obtains information relating to broadcast channels intended to broadcast the same content item and associated with respective broadcast times that are spaced in time. The time spacing between broadcast times associated with the various channels may be regular or irregular.

Following the obtainment, during rendering of the content item via a channel, called first channel, receipt of a time hop command for a time hop to be performed in the content item firstly triggers a step of selecting a broadcast channel, called second channel, different from the first broadcast channel; and secondly a step of receiving the multimedia content item from the second channel and of rendering the received content item.

It will be seen below that the multiple broadcast channels are created by the second management entity MNG2.

Although it is applicable to all types of stream, an exemplary aspect of the disclosure is ideally applicable to streams broadcast in multicast mode. In the remainder of the description, the broadcast channels broadcast multimedia streams in multicast mode.

In our example, with reference to FIG. 4, a first broadcast channel CDD1 is intended to broadcast a televised content item "live", that is to say without a delay in relation to the broadcast time scheduled by the television channel in question. The first channel CDD1 and the associated broadcast time I1 is that provided by default in a service plan of a content provider. This time I1. (the broadcast time) is generally visible via a programme guide containing all televised content items and the respective broadcast times. The programme guide is generally accessible on demand and displayed by way of a graphical interface.

FIG. 4 illustrates four channels CDD1-CDD4 allocated to rendering the same televised programme.

Let us take an example of a football match the official broadcast of which is scheduled for a Saturday evening at 8:00 p.m. (T1=8:00 p.m.) on multiple broadcast channels CDD1-CDD4 that are provided and spread over time with intervals of a few minutes, for example 10 minutes.

In our example, the channel CDD1 is the main channel, specifically the channel that broadcasts the content item at the scheduled time "live" without a delay. The other channels broadcast the same content item with a delay in relation to the main channel. The various channels will allow the match to be broadcast in multicast mode at different times t1-t4 successively, for example spaced regularly by a duration of 10 minutes.

The channels CDD1-CDD4 are contained in the service plan; the service plan indicates for example that the match will be transmitted at 8:00 p.m. and that other transmissions in multicast mode will also take place every ten minutes, that is to say 8:10 p.m. (on the channel CDD2), 8:20 p.m. (on the channel CDD3), 8:30 p.m. (on the channel CDD4), etc.

The set-top box STB then receives an access request to access the content item CNT. The access request may originate from an access command from a remote controller able to remotely control the set-top box STB.

Let us assume that an access request to access the content item is received at 8:11 p.m. (tL=8:11 p.m.). The first entity MNG1 receives this request and manages, if multiple channels are broadcasting the content item at the time of receipt of the access request, the selection of the channel that will be most appropriate to receive the content item. In other words, depending on the time of receipt of the access request tL to access the content item, the first management entity MNG1 will select a channel from among the available channels and request receipt of the content item via this channel.

According to a first variant, the selected channel is the channel whose broadcast time precedes the time of receipt of the access request tL. In our case, the broadcast time that precedes the access request tL is the latest one, specifically t2 (8:10 p.m.). This variant has the advantage of accessing the content item without a delay as the content item is already being broadcast.

According to a second variant, the selected channel is the one whose broadcast time is in the future; this time is later than the time of receipt of the access request tL; the content item has not yet been broadcast on this channel. For example, the chosen channel is the channel whose scheduled broadcast time follows the time tL of receipt of the access request. In our example, the selected channel is therefore the third broadcast channel CDD3 whose broadcast time is scheduled at t3 (8:20 p.m.), that is to say a few minutes after the time t2. In this case, the server has not started to transmit the content item. There is therefore a waiting period before receiving the content item; in return, the content item is rendered from the start. The waiting period mentioned above may be subject to transmission of a notification to inform of the waiting period before the content item is broadcast. It should be noted that, the shorter the spacing between broadcast times, the shorter the wait to receive the content item will be.

The above example is based on four channels. The number may of course be lower or higher, as will be seen below in other embodiments. Generally speaking, the second entity MNG2 may create a number "n" of channels CDD1-CDDn associated with respective broadcast times t1 to tn that are spread over time. The number "n" of channels that are created may vary depending on the type of content item and/or the duration of the content item. For example, if the content item is a content item with a large audience and therefore liable to be requested a lot, a short spacing, for example two seconds, may be relevant between each broadcast time. It will readily be understood that, for the same time spacing, the greater the length in time of the content item, the greater the number of broadcast channels.

As explained above, all of the television channels and broadcast channels are created and declared in a document called live service plan.

Following launching of the broadcasting of a content item on a first channel CDD1, at given times, for example every N minutes (2 minutes for example), a new multicast channel is created to broadcast the content item from the start thereof.

It will be specified here that creating a broadcast channel may consist in instantiating a channel. It will be recalled that the service plan groups together all accessible television channels and other content items, such as video-on-demand content items or the like. The service plan furthermore comprises, according to an exemplary aspect of the disclosure, for a televised program currently being broadcast, data relating to multicast channels and the time spacing between the broadcast times on these channels. The first management entity MNG1 thereby has knowledge both of existing channels currently broadcasting the content item and of channels that will be created in the future.

According to an exemplary aspect of the disclosure, after the broadcast channels have been created, the first management entity MNG1 installed in the set-top box playback device STB will access the information relating to the service plan and provided by the server SRV. By virtue of this information, the first entity MNG1 is able firstly to select a channel for the receipt of the content item and then, upon possible receipt of a time hop command for a time hop during playback, access the other channels separate from the current channel so as to play back the content item from another channel instead of the current channel. Due to the time offset between broadcast times on the various channels, a change of channel has the effect of performing a time hop in the content item.

Let us consider for example a current channel CDDn currently being used and having a broadcast time tn and a channel CDD(k<n) having a broadcast time tk different from tn. Let us assume that the channel CDD(k) is the channel selected to receive the content item; In this configuration, upon receiving a command to navigate in the content item, the first management entity MNG1 stops playback via the channel CDDn and then selects the channel CDD(k) and plays back the content item via this channel CDD(k). Due to the time difference between the broadcast times tn and tk, it will be understood that a time hop of X (X is a numerical value) minutes has been performed in the content item.

It should be noted that a hop may concern both fast-forwarding and rewinding in the content item.

If tk<tn, the hop will have the effect of fast-forwarding in the content item;

Si tk>tn, the hop will have the effect of rewinding in the content item.

Therefore, multiple successive changes of channel may be performed in succession.

One embodiment will be described with reference to FIG. 5 illustrating a time hop, of the type fast-forwarding in the content item, performed when playing back the content item from a source channel to a target channel. In this embodiment, the number of channels CDD1-CDD6 is reduced to six to simplify the disclosure; however, it will readily be understood that a greater number is of course conceivable. For example, for a televised programme of one hour with time spacings D of two minutes (2 mn), thirty multicast broadcast channels may be created.

Let us take an example of a film broadcast on a television channel, for example TF1, at a time t1=9:00 p.m. and the rebroadcasting of which is scheduled on other channels every two minutes, specifically at the times t2=9:02 p.m., and then at t3=9:04 p.m., throughout the entire duration of the film.

Let us assume that the user wishes to access the content item at 9:08 p.m. In this configuration, the content item has been being rendered on the channel CDD1 for eight minutes, on the channel CDD2 for six minutes, on the channel CDD3 for four minutes, and on the channel CDD4 for two minutes. The broadcasting of the same content item will launch on the channel CDD5.

In our example, the user activates a "resume from the start" function, meaning that it is desired to play back the content item from the start thereof. The first entity MNG1 selects a broadcast channel, for example the channel CDD5, which launches the broadcast at the time t5=9:08 p.m., that is to say right at the time of receipt of the access request by the first entity MNG1. This choice allows the user to view the content item from the start thereof.

At this stage, the content item is received by the playback device via the channel CDD5.

A change of channel from a source channel to a target channel will be performed. The change has the effect of selecting rendering of the content item from a new starting image; a time hop is therefore performed in the content item.

A change of channel may be a selection of an adjacent channel instead of the current channel. Let us assume that the user requests, when rendering from the channel CDD5, a forward hop in the content item. The first entity MNG1 selects the adjacent channel CDD4 and renders the image broadcast by the channel CDD4; and so on, the user may request a forward hop, the management entity MNG1 selects the corresponding adjacent channel and requests rendering of the content item via the channel CDD3.

A change of channel does not necessarily target adjacent channels. In this case, multiple channels are inserted between the source channel and the target channel. In our example, the user requests a time hop ST(I5) from the current channel CDD5 to the target channel CDD1 broadcasting the image I5.

The change may be performed by stopping rendering via the source channel and resuming rendering via the target channel CDD1, preferably without a waiting period so as to ensure rendering continuity. Continuity ensures continuous rendering of the content item even though it has been subject to a change of channel.

According to one variant, when multiple intermediate channels are inserted between the source channel and the target channel, during a hop, the images broadcast on broadcast channels belonging to the intermediate channels, here the channels CDD2, CDD3, CDD4, are rendered. The images are preferably rendered successively in the direction of the hop so as to deduce the state of progress of the hop in the content item under consideration. Following the various rendering operations, playback may resume via the second channel.

According to another variant, the rendered images are able to be selected; selecting an image rendered during a hop then triggers stoppage of the hop and resumption of the playback of the content item from the selected image.

FIG. 6 illustrates the evolution of the rendering on the screen resulting from the time hop ST(I5) resulting from the change of channel, specifically the playback of the image I5 following the playback of the image IL The hop that is performed is transparent to a user viewing the content item; for the user, the images rendered in succession, specifically I5 and then I1, appear to come from the same broadcast channel.

According to the variant described above, the images I2, I3, I4 may also be rendered successively during the hop in order to have an idea of the state of progress of the hop.

According to the other variant described above, the images I2 to I4 are able to be selected. Let us assume that the image I3 is selected when it is rendered during the hop; in this case, the selection brings about stoppage of the hop and continuing of the playback from this selected image I3.

A time hop of the type rewinding in the content item is now described with reference to FIG. 7.

Let us assume that, at 9:18 p.m., the image I9 currently being rendered via the channel CDD1, the user requests rewinding in the content item with his control device by performing a time hop ST(I8). This rewinding in time may occur when the user wishes to return to a portion of the content item, for example a particular scene of a film.

Upon receipt of the hop command ST(I8), the first entity MNG1 stops the playback of the content item via the channel CDD1 and requests access to the content item via the adjacent channel CDD2. The user may request other hops by one unit until the desired channel.

In our example, the desired hop is selected via two commands, specifically one command that allows fast-forwarding in the content item, for example associated with the symbol "»", and one command for rewinding in the content item, associated with the symbol "«".

An interface makes it possible to select one of the two commands. This interface may correspond to physical buttons or to touch commands, voice commands or any other similar commands.

In our example, the commands are able to be manipulated on a screen. One or the other of the commands may be inoperative in some cases, as is explained below; if this case arises, the command in question is deactivated.

The deactivation consists for example in making the command inaccessible; for example, the command is not displayed on the screen.

Two cases in which a command is deactivated are presented with reference to FIGS. 8 and 9. In these two figures, one channel is selected, the channel CDD1 in FIG. 8 and the channel CDD2 in FIG. 9. In these figures, an arrow attached to the references CDD1 and CDD2 means that these channels have been selected by the first entity ENT1 to render the content item.

These two figures contain the fast-forward or rewind commands when they are active depending on the broadcast times of the other broadcast channels.

In our example, the fast-forward command "»" will be active in connection with a selected channel only if there is another channel already currently broadcasting the same content item; for example, in FIG. 8, the channel CDD1 is selected; there is no channel having an earlier broadcast time that is currently being broadcast; in this case, the command is inactive.

In our example, the rewind command will be active in connection with a selected channel only if a new channel instance becomes accessible with an additional delay (2 minutes in our example) in relation to the selected channel CDD1. With reference to FIG. 8, at the time t2, the channel CDD2 broadcasts the content item; the rewind command "«" is then activated until an adjacent channel broadcasts the content item again.

FIG. 9 illustrates the case where the second channel CDD2 is selected. From the time t2 to t3, only one channel is being broadcast, specifically the channel CDD1, and the fast-forward command "»" is therefore active throughout the entire playback. The rewind command "«" is inactive since the content item is no longer being broadcast on the channel CDD3.

The channel CDD3 broadcasts the content item at the time t3. From this time t3, the rewind command "«" and fast-forward command "»" become active.

It will lastly be specified that the first management entity MNG1 is equipped with a processor configured to perform the following steps,
  during rendering of the content item via a channel, called first channel, receipt of a time hop command for a time hop in the content item brings about
  a step of selecting a broadcast channel, called second channel, different from the first broadcast channel;
  a step of receiving the multimedia content item from the second channel and rendering the received content item.

It should also be specified here that the term module or the term entity may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

Although the present disclosure has been described with reference to one or more examples, workers skilled in the art will recognize that changes may be made in form and detail without departing from the scope of the disclosure and/or the appended claims.

The invention claimed is:

1. A management method comprising:
 managing time hops when playing back a multimedia content item received by a playback device via a communication network, the managing comprising:
  obtaining a plurality of broadcast channels for a same content item, respective broadcast times of the content item for the plurality of broadcast channels being spaced in time; and
  during rendering of the content item via a channel, called first channel, of the plurality of broadcast channels, receiving a time hop command for a time hop in the content item, wherein receipt of the time hop command brings about:
   selecting a broadcast channel of the plurality of broadcast channels, called second channel, different from the first channel, wherein the plurality of broadcast channels comprises intermediate broadcast channels having respective broadcast times in between the broadcast times of the first channel and the second channel; and
   during a hop from the first to the second channel, rendering images broadcast on said intermediate broadcast channels, the images being rendered from successive ones of the intermediate broadcast channels in a direction of the hop.

2. The management method as claimed in claim 1, wherein the rendered images are able to be selected, and wherein selecting a rendered image triggers stoppage of the hop and playback of the content item from this image.

3. The management method as claimed in claim 1, wherein, when the time hop command relates to fast-forwarding in the content item, the time hop command on the first channel is activated as soon as at least one second channel broadcasts the content item at a time of receipt of the hop command.

4. The management method as claimed in claim 1, wherein the channels that are obtained are able to broadcast the content item in multicast mode.

5. A management entity for managing time hops when playing back a multimedia content item received by a playback device via a communication network, the management entity comprising:
 a processor; and
 a non-transitory computer readable medium comprising instructions stored thereon which when executed by the processor configure the management entity to:
  obtain a plurality of broadcast channels for a same content item, respective broadcast times of the content item for the plurality of broadcast channels being spaced in time,
  during rendering of the content item via a channel, called first channel, receive a time hop command for a time hop in the content item, which brings about:
   selecting a broadcast channel of the plurality of broadcast channels, called second channel, different from the first channel, wherein the plurality of broadcast channels comprises intermediate broadcast channels having respective broadcast times in between the broadcast times of the first channel and the second channel;
   during a hop from the first to the second channel, rendering images broadcast on broadcast channels belonging to said intermediate broadcast channels, the images being rendered from successive ones of the intermediate broadcast channels in a direction of the hop.

6. A non-transitory computer readable data medium on which at least one series of program code instructions has been stored for executing a management method when the series of program code instructions are executed by a processor of a management entity, the management method comprising:
 managing time hops when playing back a multimedia content item received by a playback device via a communication network, the managing comprising:
  obtaining a plurality of broadcast channels for a same content item, respective broadcast times of the content item for the plurality of broadcast channels being spaced in time; and
  during rendering of the content item via a channel, called first channel, of the plurality of broadcast channels, receiving a time hop command for a time hop in the content item, wherein receipt of the time hop command brings about:
   selecting a broadcast channel of the plurality of broadcast channels, called second channel, different from the first channel, wherein the plurality of broadcast channels comprises intermediate broadcast channels having respective broadcast times in between the broadcast times of the first channel and the second channel; and
   during a hop from the first to the second channel, rendering images broadcast on broadcast channels belonging to said intermediate broadcast channels, the images being rendered from successive ones of the intermediate broadcast channels in a direction of the hop.

* * * * *